United States Patent [19]

Salvat et al.

[11] 4,305,075

[45] Dec. 8, 1981

[54] CONICALLY SCANNING ANTENNA SYSTEM FOR TRACKING RADARS

[75] Inventors: Francois Salvat; Jean Bouko, both of Paris, France

[73] Assignee: Thomson-CSF, Paris, France

[21] Appl. No.: 969,949

[22] Filed: Dec. 15, 1978

[30] Foreign Application Priority Data

Dec. 22, 1977 [FR] France ............................... 77 38826

[51] Int. Cl.[3] ......................... G01S 13/68; H01Q 3/20

[52] U.S. Cl. ..................................... 343/7.4; 343/761; 343/839; 343/781 CA

[58] Field of Search .......... 343/7.4, 761, 839, 781 CA

[56] References Cited

U.S. PATENT DOCUMENTS

| | | | |
|---|---|---|---|
| 2,877,354 | 3/1959 | Fairbanks et al. | 343/7.4 X |
| 2,929,061 | 3/1960 | Dauguet | 343/7.4 X |
| 3,307,183 | 2/1967 | Adam | 343/7.4 X |
| 3,866,233 | 2/1975 | Schmidt | 343/761 |
| 4,041,500 | 8/1977 | Lapp | 343/761 |
| 4,042,933 | 8/1977 | Lapp | 343/761 |

*Primary Examiner*—Malcolm F. Hubler
*Attorney, Agent, or Firm*—Karl F. Ross

[57] ABSTRACT

An antenna system of the Cassegrain type, used with a tracking radar and adapted to conically scan incoming waves reflected by outlying targets, comprises a paraboloidal main reflector and two hyperboloidal auxiliary reflectors confronting same. One of the auxiliary reflectors is semitransparent and coaxial as well as cofocal with the main reflector whereas the other is solid with an axis inclined to that of the main reflector about which it rotates while keeping its foci in the focal planes of the semitransparent reflector.

6 Claims, 3 Drawing Figures

CONICALLY SCANNING ANTENNA SYSTEM FOR TRACKING RADARS

FIELD AND BACKGROUND OF THE INVENTION

The present invention relates to a conically scanning antenna system for tracking radars.

A tracking radar measures the co-ordinates of a target and provides data which can be used to determine the trajectory of the target and to predict its future position. To make such a prediction, a wide variety of data available from a radar can be used such as range, elevation angle, azimuth, or Doppler frequency. This means that any radar may prima facie be considered a tracking radar as soon as the output information which it provides is processed in a suitable manner. However, a tracking radar is distinguished from other radars by the way in which the angular tracking of the target is performed, and the object of this angular tracking is to define an error which indicates the angular divergence between the axis of the antenna (known as the boresight axis) and the direction in which the target lies, this error signal being fed to servo-mechanisms designed to re-align the antenna axis with the direction of the target. Among methods which have become conventional for producing such an error signal, we may mention sequential lobing, conical scanning, and the monopulse method.

The antenna system according to our invention relies on the second method, i.e. that of conical scanning, whose principles will now be reviewed. In a conical-scanning system, the antenna is provided with a centrally symmetrical paraboloidal or reflector lens which is illuminated by a primary feed whose phase center describes about the boresight axis of the system a circle of predetermined radius lying in the focal plane. In such an antenna, the radiation pattern is no longer centered on the boresight axis but rotates in space in such a way that the direction of maximum radiation traces out a cone whose half apex angle is termed the squint angle of the antenna.

The amplitude of the signal provided by the antenna is thus modulated at the frequency of rotation of the radiation pattern and the depth of modulation is a function of the angle of the target relative to the axis of rotation. The modulation signal extracted from the echo signal is used in servomechanisms to slave the position of the antenna to the target.

Because of the central symmetry of the focusing system, the beams radiated by the antenna all overlap on the boresight axis and in general the level of overlap is such as to be of an optimum value which represents a compromise between the initial inclination, determining the aiming accuracy, and the range of the radar.

In a conventional, conically scanning antenna the radiation pattern is the same at transmission and reception and this provides an opportunity, by analyzing the transmission pattern, of finding the frequency of rotation of the pattern, which can be utilized for interference purposes.

There are applications where it must be made impossible for the frequency of rotation of the radiation pattern of a conically scanning antenna to be detected in this way.

It has already been proposed to transmit outgoing waves with a radiation pattern centered on the axis of the antenna and to receive incoming waves, reflected by outlying targets, with a conically scanning radiation pattern. An arrangement based on this principle has a primary feed of the monopulse type which feeds signals to a sum channel and two difference channels, one for elevation and the other for azimuth. The sum channel is combined with the difference channels and the conical scanning pattern is obtained, at reception, by means of a rotating variable phase shifter, which causes a phase variation between the sum and difference signals. The radiation pattern so obtained is eccentric and rotates at the speed of the phase shifter. This system provides a single-channel receiver which is not, however, proof against errors in determining angles due to fluctuations in the amplitude of the echo. What is more, the resulting equipment is relatively complicated and thus expensive.

OBJECT OF THE INVENTION

Our invention has for its object the provision of an antenna which scans conically at reception and which is capable of tracking depolarizing targets. Thus, we aim at preventing detection of the frequency of rotation of the radiation pattern.

SUMMARY OF THE INVENTION

Since, generally speaking, conically scanning antenna systems are less complex and less expensive to produce than sequential-lobing systems or monopulse systems, we provide in accordance with the invention an antenna system of this character which is derived from a system of the Cassegrain type, that is to say a system which has a main reflector with a paraboloidal concave surface centered on a principal axis on which the associated feed is also located, a first auxiliary reflector confronting the paraboloidal surface of the main reflector as well as the feed with a hyperboloidally curved first convex surface centered on the principal axis, and a second auxiliary reflector also confronting the paraboloidal surface of the main reflector and the feed with a hyperboloidally curved convex surface while being separated therefrom by the first auxiliary reflector which reflects linearly polarized outgoing waves but is substantially transparent to linearly polarized incoming waves, the electric-field vectors of the incoming and outgoing waves being mutually orthogonal and transverse to the principal axis. The second auxiliary reflector, whose convex surface is solid and whose own axis is inclined to the principal axis at an acute angle, is provided with drive means for rotating same about the principal axis, thereby subjecting incoming waves to a conical scan. These incoming waves, echoed by an outlying target toward the main reflector, pass twice through the first auxiliary reflector on their way from the main reflector to the second auxiliary reflector and thence to the feed. The latter may be a horn with an input guide coupled to a transmitting section and an output guide coupled to a receiving section of a tracking radar of which the antenna forms part.

BRIEF DESCRIPTION OF THE DRAWING

The above and other features of our invention will now be described in detail with reference to the accompanying drawing in which.

SPECIFIC DESCRIPTION

Figure 1:
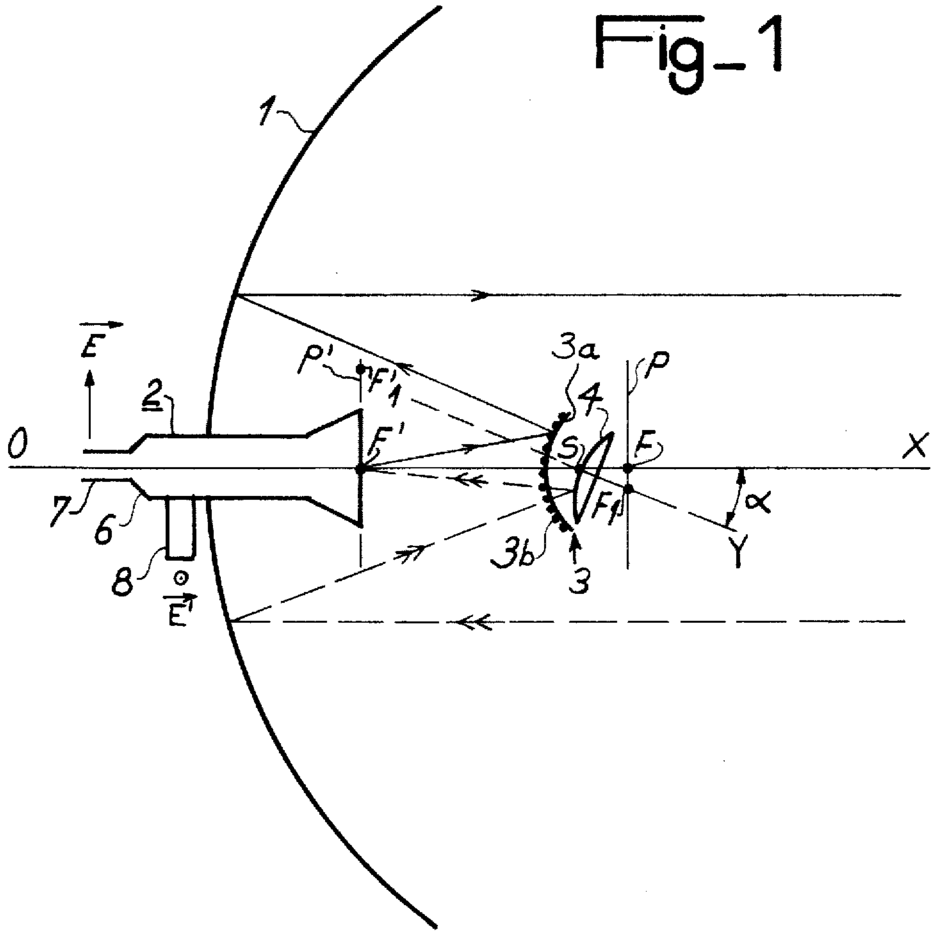
FIG. 1 is a diagrammatic elevational view of an antenna system according to the invention.

FIG. 1 is a schematic view of an antenna of the Cassegrain type comprising a main reflector 1 whose concave surface is a paraboloid of revolution about a principal axis OX, a primary feed 2 which, in the embodiment illustrated, is situated on that axis a first auxiliary reflector 3 with a convex surface which is a segment of a hyperboloid of revolution about axis OX, and a second auxiliary reflector 4 with a convex surface which is a segment of a hyperboloid of revolution and whose axis SY is inclined to the principal axis OX.

The relative positions of these reflectors are such that a point F is a focus both of the paraboloidal main reflector 1 and of the auxiliary reflector 3.

The second focus F' of the hyperboloidal auxiliary reflector 3 coincides with the phase center of the primary feed 2. A first focus of the hyperboloidal auxiliary reflector 4, i.e. a point $F_1$ is situated in the common focal plane P of the paraboloidal reflector 1 and of the first auxiliary reflector 3 while its second focus $F_1'$ is situated in the second focal plane P' of reflector 3 which contains the phase center F'.

In accordance with the invention, the antenna system needs to be capable of receiving waves reflected by a target which has a depolarizing effect. Thus, the primary feed 2 must be able to radiate with two mutually orthogonal linear polarizations. In the present embodiment, the primary feed is a horn of circular cross-section which may be corrugated and is situated at the end of a guide 6 of circular cross-section fed by two guides 7 and 8 of rectangular cross-section. Guide 7 propagates a linearly polarized wave whose electric-field vector is, for example, vertical whereas guide 8 propagates a linearly polarized wave whose electric-field vector is horizontal. In this instance, guide 7 feeds the horn at transmission whereas guide 8 receives the incoming wave reflected by the target.

The paraboloidal main reflector 1 is similar to the main reflector of any Cassegrain antenna.

The first hyperboloidal auxiliary reflector 3, whose foci are points F and F', is a semitransparent grid structure designed as a figure of revolution and formed by wires 3a generally parallel to the electric-field vector of the linearly polarized transmitted wave which, in the embodiment presently being described, is vertical. Consequently, this grid reflects the transmitted wave, which has an electrical vector $\vec{E}$, towards the main reflector 1, which sends it back into space parallel to the axis OX.

At reception, the wave reflected by the depolarizing target concerned has a horizontal electric-field vector $\vec{E}$. Under these conditions, the hyperboloidal auxiliary reflector 3 composed of wires passes the reflected wave, which is picked up by the second hyperboloidal auxiliary reflector 4.

The convex surface of reflector 4 is a solid segment of a hyperboloid which rotates on its axis SY (the latter being inclined at an angle $\alpha$ to the principal axis OX of the system) and whose apex S lies on the axis OX.

Figure 2:
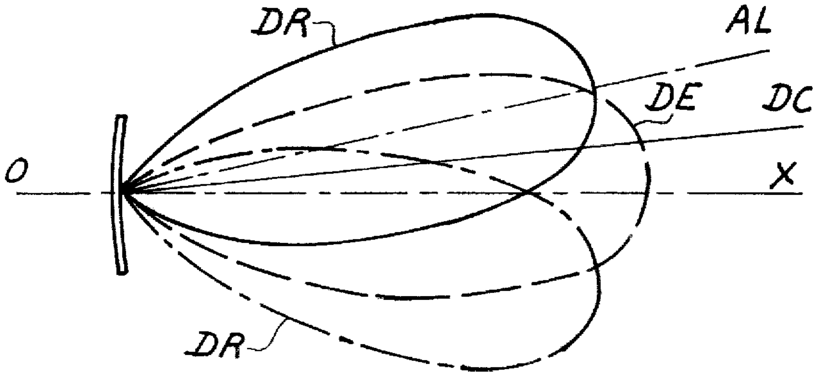
FIG. 2 shows the radiation patterns of the system of FIG. 1 at reception and transmission.
Figure 3:
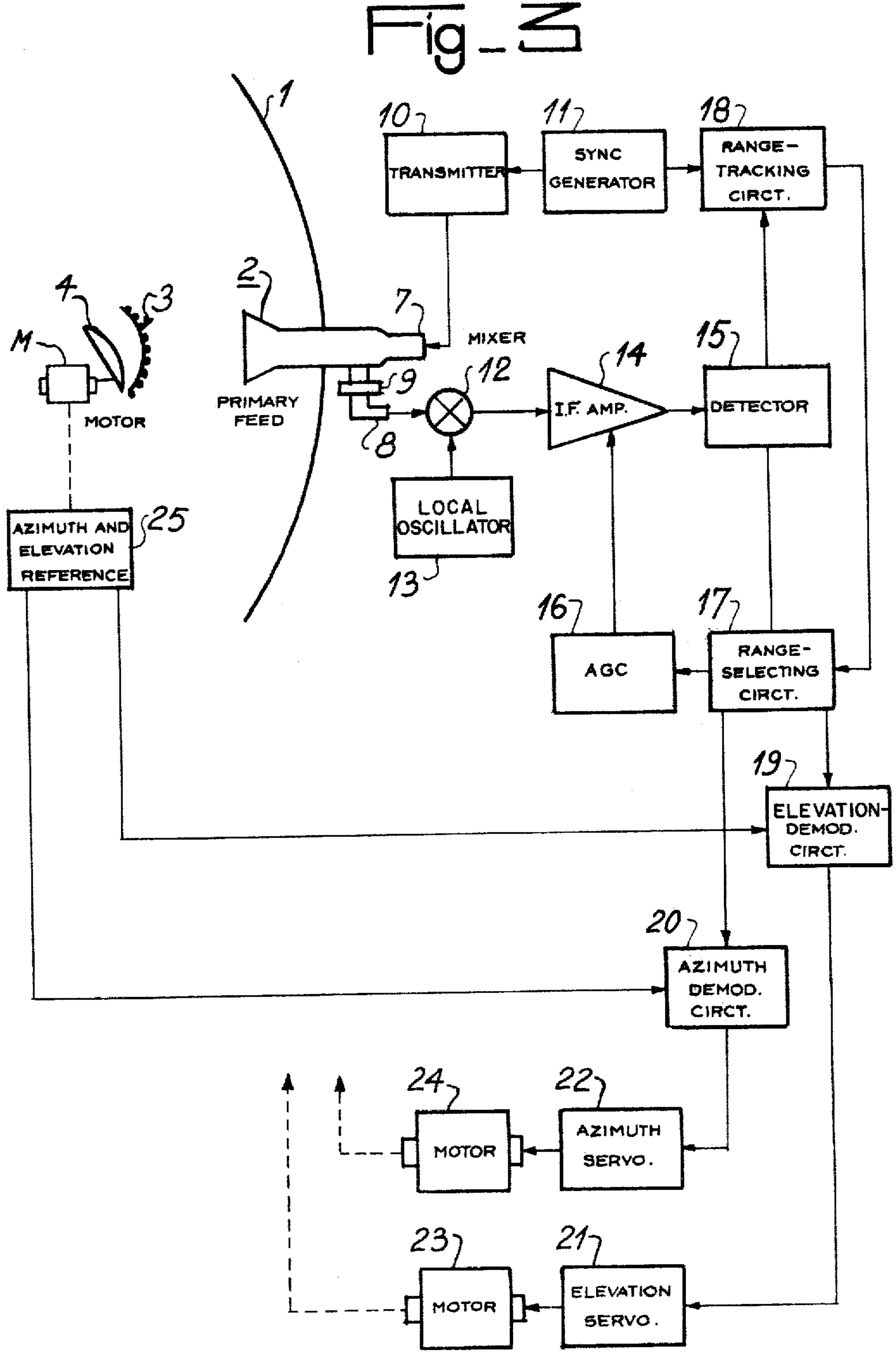
FIG. 3 is a diagram of a tracking radar incorporating the antenna system of FIG. 1.

This reflector is driven in rotation by a motor indicated by reference numeral M (FIG. 3). The rotation of the auxiliary reflector 4 about the principal axis of the system enables a conical scan to be performed at reception. The focus $F_1$ of the hyperboloidal reflector 4 describes a circle with center F, which is the common focus of the main reflector and the first auxiliary reflector 3, in the focal plane P. The radiation pattern DR at reception, which can be seen in FIG. 2, rotates about axis OX with a level of lobe overlap on that axis defined by the angle of inclination $\alpha$.

In FIG. 2 we have further shown the transmission radiation pattern DE which is fixed and centered on the axis OX. Also shown is the axis AL of lobe DR and the direction DC in which the target lies.

In FIG. 1 the path of a transmitted or outgoing wave is shown as a solid line and that of a reflected or incoming wave as a broken line.

The generally parallel wires forming the hyperboloidal auxiliary reflector 3 used for transmission are of a relatively small size depending upon the operating frequency band of the antenna. In the $K_u$ band, for example, the wires have a diameter of the order of 0.12 cm with a pitch of 0.6 cm and the diameter of the reflector does not exceed 110 cm, with a focal length of the order of 171 cm. From the mechanical point of view, the wires are carried either by a so-called sandwich structure or by a single self-matching skin.

With due consideration of the relative spacing of the two hyperboloidal auxiliary reflectors, we find it necessary to select a grid structure of minimum thickness so as not to hamper the rotation of reflector 4. If a self-matching skin is used, it should have a compensating array of wires 3b orthogonal to the reflecting wires 3a but designed to avoid interference with reception of incoming waves.

The rotating auxiliary reflector 4, in a specific instance, has a diameter of 95 cm and a focal length of 171 cm, whereas the main reflector 1 has a diameter of the order of 800 cm and a focal length of 255 cm.

FIG. 3 is a diagram of a conically scanning radar which employs the antenna system according to our invention and, being essentially conventional, need not be described in detail.

The primary feed 2 is seen to be connected by its input guide 7 to a transmitter 10, controlled by a synchronization generator 11, and by its output guide 8, via a TR box 9, to the reception section which comprises a mixing circuit 12 connected to a local oscillator 13 and to an intermediate-frequency amplifier 14 followed by a detector 15. The amplifier 14 is connected to an automatic-gain-control circuit 16 which is connected to a range-selecting circuit 17. The latter circuit is fed by a range-tracking circuit 18 which is connected to the synchronization generator 11. The range-selecting circuit 17 is connected to an elevation-demodulation circuit 19 and to an azimuth-demodulation circuit 20 which receive reference information on elevation and azimuth, respectively via a circuit 25, from the motor M driving the hyperbolic auxiliary reflector 4 of the antenna. These circuits determine the errors in azimuth and elevation and transmit them to azimuth and elevation servomechanisms 21 and 22 which supply respective motors 23 and 24 acting to bring the axis of the antenna back onto the target.

When fitted to a tracking radar, an antenna according to our invention has the advantages which were mentioned hereinabove, in particular that it is impossible to determine the frequency of rotation of the conical-scan pattern. Another advantage is that the operation of the radar is not impaired under adverse atmospheric conditions, thanks to the fact that drops of rain, for example, have only a very slight depolarizing effect.

What is claimed is:

1. An antenna system comprising:

a main reflector with a paraboloidal concave surface centered on a principal axis;

feed means on said principal axis for emitting linearly polarized outgoing waves with an electric-field vector oriented in a predetermined first direction transverse to said principal axis and for receiving linearly polarized incoming waves with an electric-field vector oriented in a second direction orthogonal to said first direction;

a first auxiliary reflector confronting said paraboloidal surface and said feed means with a hyperboloidally curved first convex surface centered on said principal axis, said first auxiliary reflector being substantially transparent to said incoming waves but reflecting said outgoing waves from said feed means onto said paraboloidal surface for transmission in the direction of said principal axis;

a second auxiliarly reflector confronting said paraboloidal surface and said feed means with a hyperboloidally curved solid second convex surface centered on an axis inclined to said principal axis at an acute angle, said first auxiliary reflector lying between said main reflêctor and said second auxiliary reflector whereby incoming waves reflected from said paraboloidal surface toward said second auxiliary reflector and redirected by the latter toward said feed means pass twice through said first auxiliary reflector; and drive means coupled with said second auxiliary reflector for rotating same about said principal axis, thereby subjecting said incoming waves to a conical scan.

2. An antenna system as defined in claim 1 wherein said second convex surface has a focal point in a plane transverse to said principal axis passing through a common focus of said first convex surface and said paraboloidal surface.

3. An antenna system as defined in claim 2 wherein said second convex surface has an apex on said principal axis and another focal point in another plane transverse to said principal axis passing through a second focus of said first convex surface.

4. An antenna system as defined in claim 3 wherein said feed means has a phase center coinciding with said second focus.

5. In a tracking radar, in combination:

transmission means generating linearly polarized outgoing waves;

a horn centered on a principal axis, said horn having an input guide coupled to said transmission means for axially emitting said outgoing waves with an electric-field vector oriented in a predetermined first direction transverse to said principal axis and further having an output guide for conveying incoming waves echoed by outlying targets with an electric-field vector oriented in a second direction orthogonal to said first direction;

receiving means coupled with said output guide;

a main reflector with a paraboloidal concave surface centered on said principal axis;

a first auxiliary reflector confronting said paraboloidal surface and said horn with a hyperboloidally curved first convex surface centered on said principal axis, said first auxiliary reflector being substantially transparent to said incoming waves but reflecting said outgoing waves from said horn onto said paraboloidal surface for transmission in the direction of said principal axis;

a second auxiliary reflector confronting said paraboloidal surface and said horn with a hyperboloidally curved solid second convex surface centered on an axis inclined to said principal axis at a acute angle, said first auxiliary reflector lying between said main reflector and said second auxiliary reflector whereby incoming waves reflected from said paraboloidal surface toward said second auxiliary reflector and redirected by the latter toward said horn pass twice through said first auxiliary reflector, said reflectors forming an antenna system; and drive means coupled with said second auxiliary reflector for rotating same about said principal axis, thereby subjecting said incoming waves to a conical scan.

6. An antenna system as defined in claim 1, 2, 3, 4 or 5 wherein said first auxiliary reflector has a grid structure with wires generally parallel to said first direction.

* * * * *